United States Patent
Kalam

(10) Patent No.: US 10,446,941 B1
(45) Date of Patent: Oct. 15, 2019

(54) WIRELESS CAMERA TRACKING SYSTEM

(71) Applicant: Sling Media Pvt. Ltd., Marathahalli, Bangalore (IN)

(72) Inventor: Arun Pulasseri Kalam, Karnataka (IN)

(73) Assignee: Sling Media Pvt. Ltd., Marathahalli (IN)

( * ) Notice: Subject to any disclaimer, the term of this patent is extended or adjusted under 35 U.S.C. 154(b) by 0 days.

(21) Appl. No.: 15/983,362

(22) Filed: May 18, 2018

(51) Int. Cl.
| | | |
|---|---|---|
| H01Q 21/28 | (2006.01) | |
| H01Q 21/29 | (2006.01) | |
| G01S 3/72 | (2006.01) | |
| H04N 5/232 | (2006.01) | |
| H01Q 1/22 | (2006.01) | |
| H04W 4/029 | (2018.01) | |

(52) U.S. Cl.
CPC .............. *H01Q 21/28* (2013.01); *G01S 3/72* (2013.01); *H01Q 1/2225* (2013.01); *H01Q 21/293* (2013.01); *H04N 5/23203* (2013.01); *H04W 4/029* (2018.02)

(58) Field of Classification Search
CPC .... H01Q 21/28; H01Q 1/2225; H01Q 21/293; H04N 5/23203; G01S 3/72; H04W 4/029
See application file for complete search history.

(56) References Cited

U.S. PATENT DOCUMENTS

| | | | |
|---|---|---|---|
| 9,008,354 B2 | 4/2015 | Shanks | |
| 2006/0216011 A1* | 9/2006 | Godehn | G01S 3/046 396/58 |
| 2008/0095401 A1* | 4/2008 | Saleh | G01S 3/808 382/103 |
| 2009/0160638 A1* | 6/2009 | Jesme | G01S 13/825 340/539.11 |
| 2014/0073352 A1* | 3/2014 | Aldana | G01S 13/876 455/456.1 |
| 2016/0141744 A1 | 5/2016 | Smith et al. | |
| 2016/0290764 A1 | 10/2016 | Chen | |
| 2017/0289505 A1 | 10/2017 | Johnson et al. | |

* cited by examiner

*Primary Examiner* — Hai V Tran
(74) *Attorney, Agent, or Firm* — Kilpatrick Townsend & Stockton LLP

(57) ABSTRACT

Various arrangements of wireless tracking systems are presented. A tag device may be presented that include a first plurality of antennas. Each antenna of the first plurality of antennas may have an antenna radiation pattern pointed in a different direction. The tag device may include a wireless transmitter interface that transmits via each antenna of the first plurality of antennas. The wireless tracking system may also include a tracker device that tracks a direction to the tag device. The tracker device may include a second plurality of antennas. Each antenna of the second plurality of antennas may have an antenna radiation pattern pointed in a different direction. The tracker device may include a wireless interface receiver that performs a plurality of signal strength measurements using the second plurality of antennas.

20 Claims, 10 Drawing Sheets

WIRELESS CAMERA TRACKING SYSTEM

BACKGROUND

In certain scenarios, a cameraman may not be practical or available in order to point a camera. Rather, a motorized targeting system may be desired that points a camera at a particular subject. Such an arrangement may allow for video or still capture of a subject, despite the subject moving. However, keeping the camera targeted on the subject can be a difficult task, especially when various obstacles are present in the vicinity of the motorized targeting system and/or the subject. Of particular difficulty may be the situation where obstacles are located between the motorized targeting system and the subject.

SUMMARY

Various embodiments are described related to a wireless tracking system. In some embodiments, a wireless tracking system is described. The system may include a tag device. The tag device may include a first plurality of antennas, each antenna of the first plurality of antennas having an antenna radiation pattern pointed in a different direction. The tag device may include a wireless transmitter interface that transmits via each antenna of the first plurality of antennas. The tag device may include a processing system that causes the wireless transmitter interface to transmit a sequence of messages via the first plurality of antennas. Each message of the sequence of messages may be transmitted via a different antenna of the first plurality of antennas. Each message of the sequence of messages may be transmitted for a defined time period. Each message of the sequence may include an identifier of the antenna of the first plurality of antennas from which it is transmitted. The system may include a tracker device that tracks a direction from the tracker device to the tag device. The tracker device may include a second plurality of antennas, each antenna of the second plurality of antennas having an antenna radiation pattern pointed in a different direction. The tracker device may include a wireless interface receiver that performs a plurality of signal strength measurements. Each signal strength measurement may be made via a different antenna of the second plurality of antennas during the defined time period. The system may include a processing system configured to receive the plurality of signal strength measurements. The processing system may be configured to determine the direction from the tracker device to the tag device using the plurality of signal strength measurements.

Embodiments of such a system may include one or more of the following features: The wireless tracking system may include a motorized tracking assembly. The processing system of the tracker device may be further configured to output the direction to a motorized tracking assembly. The motorized tracking assembly may be configured to physically point a mount of the motorized tracking assembly based on the direction data. The motorized tracking assembly may be configured to have a video camera mounted onto the mount. The second plurality of antennas may have a greater number of antennas than the first plurality of antennas. The first plurality of antennas may include four antennas with each antenna of the first plurality of antennas having a 90 degree radiation pattern. The second plurality of antennas may include twenty-four antennas with each antenna of the second plurality of antennas having a 15 degree radiation pattern. The processing system may be configured to determine the direction from the tracker device to the tag device using the plurality of signal strength measurements. The processing system may determine that the signal strength measurements made by the wireless interface receiver from the sequence of messages transmitted by the first plurality of antennas are inconclusive as to which of the first plurality of antennas is pointed towards the tracker device. The processing system may, in response to the determining, identify a first antenna of the second plurality of antennas and a second antenna of the second plurality of antennas through which signal strength measurements were made that were below a minimum threshold value and between which the signal strength measurements were above the minimum threshold value. The processing system may determine the direction from the tracker device to the tag device as a center of an angle between the first antenna and the second antenna. The wireless transmitter interface may transmit using the IEEE 802.11a standard. Each message may further include a tag identifier that identifies the tag device. The tag device may further include a battery compartment and the tag device may be exclusively powered by one or more batteries installed in the battery compartment.

In some embodiments, a method of using a wireless tracking system is described. The method may include transmitting, by a tag device of the wireless tracking system, a signal via each tag antenna of a plurality of tag antennas of the tag device. Each tag antenna of the plurality of tag antennas may be pointed in a different direction. Each signal may be transmitted sequentially. The method may include receiving, by a tracker device of the wireless tracking system, each signal transmitted via each tag antenna using each tracker antenna of a plurality of tracker antennas of the tracker device. Each signal may identify the tag antenna of the plurality of tag antennas of the tag device from which the signal was transmitted. The method may include performing, by the tracker device, a plurality of signal strength measurements for each signal received via each tracker antenna of the plurality of tracker antennas. The method may include determining the direction from the plurality of tracker antennas to the tag device using the plurality of signal strength measurements.

Embodiments of such a method may include one or more of the following features: The method may include outputting, by the tracker device, direction data indicative of the direction to a motorized tracking assembly, and the motorized tracking assembly may be configured to physically point a mount of the motorized tracking assembly based on the direction data. The method may include capturing video using a video camera that is mounted to the mount of the motorized tracking assembly. The plurality of tracker antennas may have a greater number of antennas than the plurality of tag antennas. Determining the direction to the tag device using the plurality of signal strength measurements may include determining that the signal strength measurements made from the signals transmitted by the first plurality of antennas are inconclusive as to which of the plurality of tag antennas may be pointed towards the plurality of tracker antennas. The method may include, in response to the determining, identifying a first antenna of the plurality of tracker antennas and a second antenna of the plurality of tracker antennas through which signal strength measurements were made that were below a minimum threshold value and between which the signal strength measurements were above the minimum threshold value. The method may include determining the direction to the tag device as a center of an angle between the first antenna and the second antenna. The tag device may transmit the signals using the IEEE 802.11a standard. Each signal may further include a tag identifier that identifies the tag device. The method may include exclusively powering the tag device using one or more on-board batteries. The plurality of tag antennas may include four tag antennas. The plurality of tracker antennas may include twenty-four tracker antennas.

DETAILED DESCRIPTION

Figure 1:
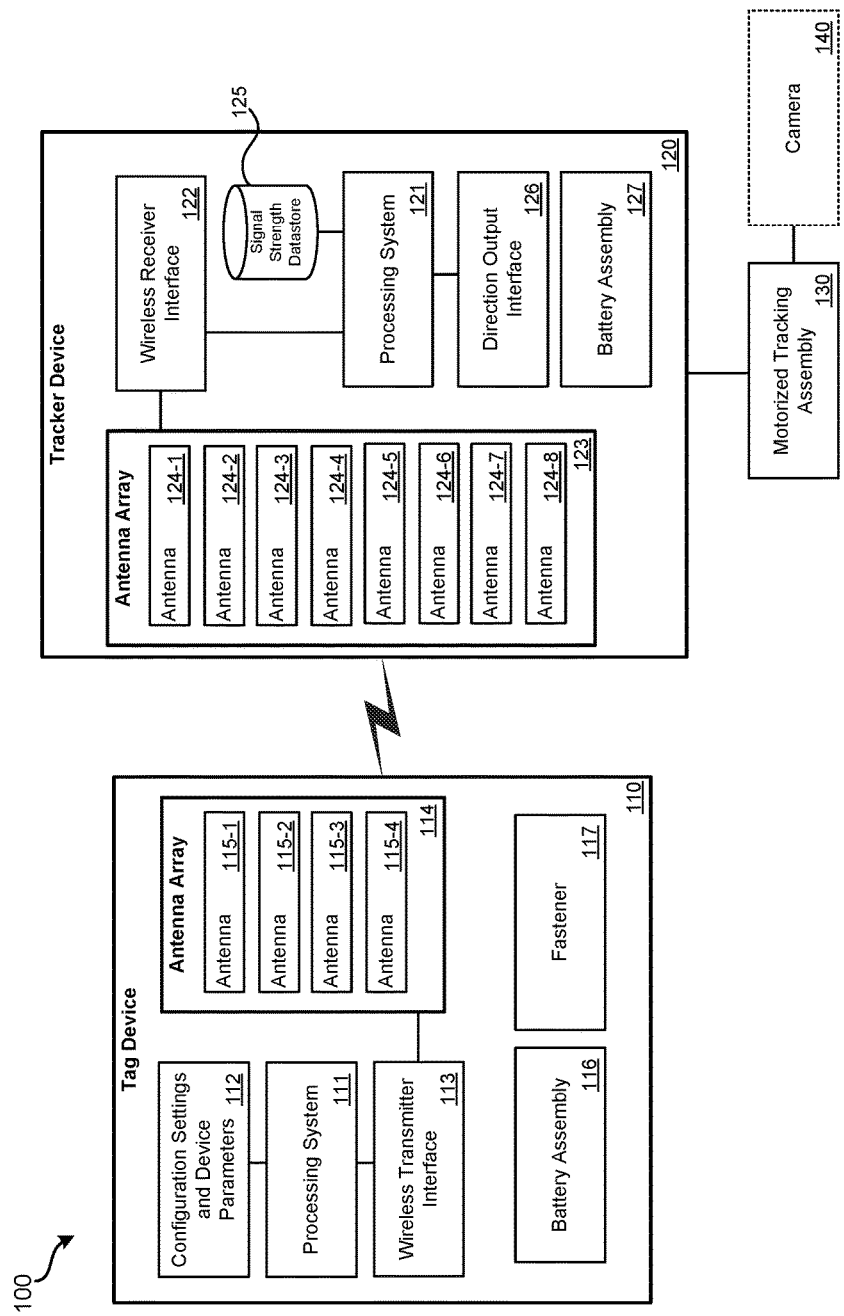
FIG. 1 illustrates an embodiment of a wireless camera tracking system.

A camera tracking system may include a tag device (referred to as a "tag" for short) and a tracker device (referred to as a "tracker" for short). The tag may be affixed to or otherwise placed in the vicinity of a subject that may move. For example, the subject may be a person, animal, robot, machinery, or other object that is desired to be tracked. The tag may transmit messages via multiple antennas. Each of these antennas may be pointed in a different direction. For instance, four antennas may be arranged that each have a main lobe of an antenna beam pattern offset by 90° in a plane parallel to the ground. Each antenna may be used to transmit a message that identifies: 1) the tag; and 2) the antenna of the tag through which the message was transmitted. Each antenna of the tag may be used to transmit in a sequential or repeating pattern. The amount of time during which each antenna transmits may be constant, such that the transmissions can be understood as a time division multiple access (TDMA) arrangement.

A tracker may receive the transmitted messages via multiple antennas. The tag may transmit using a first antenna during a first the time period. During this time period, the tracker may make a received signal strength indication (RSSI) measurement on each of the tracker's antennas. The tracker may repeat these measurements for each time period during which a different antenna of the tag is transmitting a message. Therefore, after a number of time periods equal to the number of antennas of the tag, the tracker may have made signal strength measurements using each of the tracker's antennas on signals transmitted by each of the tag's antennas.

Using the signal strength measurements made by the tracker, the tracker can cause a motorized tracking assembly to point in a direction of the tag. In certain situations, such as when the signal strength received by the tracker from a particular antenna of the tag, has a greater signal strength (and, possibly, a flat wave front), it may be determined that the particular antenna of the tag is pointed in the direction of the tracker (and the signal received from that antenna is unlikely to be reflecting off of an obstacle). In such a scenario, the motorized tracking assembly may be caused to point in the direction in which the tracker's antenna that received the highest signal strength from the highest signal strength antenna of the tag is pointed. In other situations, such as where one or more obstacles are present between or in the vicinity of the tracker and tag, a more detailed analysis, such as detailed in relation to method 700 of FIG. 7, may be performed to determine in which direction the tag is located.

While embodiments detailed herein are focused on using a motorized tracking assembly to point a camera attached to a mount of the motorized tracking assembly, it should be understood that such a tracking system may be used to point other forms of systems or devices. For example, such an arrangement may be used for pointing a telescope or binoculars aimed at a moving target on the earth or in the air. Such an arrangement may be used for pointing a laser, a spotlight, an audio speaker, a platform, or some other device or system that can be coupled with a motorized tracking assembly. In still other embodiments, the tracking system may not physically point a system or device in the direction of the tag, but rather may output the determined direction to another system or device for use externally. For instance, such a system may be used for generally tracking the whereabouts of an employee in a warehouse or office building.

Greater detail is provided in relation to the figures. FIG. 1 illustrates an embodiment of a wireless camera tracking system 100. Wireless camera tracking system 100 may include: tag device 110 (referred to as "tag 110" for short), tracker device 120 (referred to as "tracker 120" for short), motorized tracking assembly 130, and camera 140. Tag device 110 may be a device that is attached to, affixed to, or otherwise placed or in the vicinity of an object, animal, or person that is desired to be tracked by tracker 120. For example, tag 110 may be attached to: a speaker at a presentation, a pet, a performer, a ball or puck, or an athlete. Tag 110 may include: processing system 111, configuration settings and device parameters 112, wireless transmitter interface 113, antenna array 114, antennas 115, battery assembly 116, and fastener 117. Fastener 117 may be used to attach tag 110 to the object, animal, or person to be tracked. Fastener 117 may be various types of fasteners, such as: glue, tape, a hook-and-loop system, a nail, a screw, a wearable bracelet, anklet, pendant, etc. since tag 110 is relatively small, fastener 117 may be selected based on the object, animal, or person to which tag 110 is to be fastened. In some embodiments, fastener 117 is not needed. For example, tag 110 may be placed in a person's pocket. In still other embodiments, tag 110 may be permanently installed as part of another device. For instance, tag 110 may be incorporated in a microphone.

Processing system 111 may include one or more processors and/or other computerized components and may perform onboard processing on tag device 110. Processing system 111 may access configuration settings and device parameters 112 to determine how and what data should be transmitted via wireless transmitter interface 113. Configuration settings and device parameters 112 may indicate an identifier for tag 110. This identifier may be intended to be unique from other tag devices and/or other wireless devices in the area. In some embodiments, the tag identifier is a MAC address. Configuration settings a device parameters 112 may also include identifiers for individual antennas of antenna array 114. Configuration settings and device parameters 112 may also include settings that indicate how frequently tag 110 should transmit via each antenna of antenna array 114 and, possibly, how long each data transmission should last. Such a configuration settings and device parameters 112 may be updated by processing system 111 in response to command messages received from tracker device 120 or some other device. For instance, in a situation where a large amount of obstacles are present, tag device 110 may receive a command from tracker device 120 or some other source that indicates tag device 110 should transmit more frequently and/or with a higher power.

Wireless transmitter interface 113 may transmit messages via antennas 115 of antenna array 114. Wireless transmitter interface 113 may receive data from processing system 111 to transmit. In some embodiments, wireless transmitter interface 113 appends data to data received from processing system 111 to be broadcast via antennas 115. For instance, processing system 111 may not be able to determine which antenna a message will be transmitted from. Rather, wireless transmitter interface 113 may make such a determination and append an identifier of the particular antenna. Wireless transmitter interface 113 may communicate using one or more wireless communication protocols. In some embodiments, wireless transmitter interface 113 communicates using the IEEE 802.11a standard. The standard may be selected because it is a relatively high power communication standard and there may be relatively little interference from other devices in the vicinity of tag device 110. It should be understood that in other embodiments, different communication standards may be used. For example, Bluetooth or Wi-Fi may be used instead. Wireless transmitter interface 113 is referred to as a transmitter, however it should be understood that this is to indicate tag 110 primarily transmits messages to tracker device 120. It should be understood that wireless transmitter interface 113 can function as a transceiver and receive messages from tracker 120 and/or other devices via antenna array 114.

Wireless transmitter interface 113 may communicate using antenna array 114. Antenna array 114 includes multiple antennas that are each arranged such that the primary lobe of each antennas radiation pattern points in a different direction. For example, each of four antennas 115 (115-1, 115-2, 115-3, and 115-4) may have their primary antenna lobes offset from each other by 90° in a plane parallel to the ground. While four antennas 115 are illustrated, it should be understood that this number of antennas is exemplary; greater or fewer numbers of antennas 115 may be present in other embodiments. For example, it may be possible to more accurately identify the location of tag 110 if eight antennas are present that have their primary antenna lobes offset from each other by 45°. In some embodiments, each of antennas 115 may be the same antenna design, but mounted in a different physical arrangement within or on tag 110.

Wireless transmitter interface 113 may which antenna of antenna array 114 is used to transmit a message. For example, wireless transmitter interface 113 may transmit using antenna 115-1, then transmit a message using antenna 115-2, then transmit a message using antenna 115-3, then transmit a message using antenna 115-4, and then repeat the sequence. In some embodiments, processing system 111 may instruct wireless transmitter interface 113 which antenna of antenna array 114 to use to transmit a particular message.

Battery assembly 116 may be used to house one or more batteries. The one or more batteries housed by battery assembly 116 may be used to exclusively power tag device 110. That is, components of tag 110 may not receive power from a source other than battery assembly 116. Accordingly, tag 110 may be understood to be a wireless device since it wirelessly communicates and has an onboard power source.

Tracker device 120 may be used to determine a direction to tag device 110. Tracker device 120 may include: processing system 121, wireless receiver interface 122, antenna array 123, antennas 124, signal strength datastore 125, and direction output interface 126. Processing system 121 may include one or more processors that are in communication with wireless receiver interface 122, direction output interface 126, and signal strength datastore 125. Processing system 121 may be used to analyze the received signal strength measurements and determine a direction in which tag 110 is located based on such signal strength measurements.

Wireless receiver interface 122 may receive messages transmitted by tag 110 via antenna array 123. When a message is transmitted using a particular antenna of antenna array 114 of tag 110, tracker 120 may use each antenna of antenna array 123 to receive a portion of the message. For example, various segments of the message may be a repeating pattern that is transmitted and that is assessed for signal strength. Wireless receiver interface 122 may perform various signal strength measurements, which can be referred to as RSSI measurements. These measurements may be output to processing system 121 and may be stored in signal strength datastore 125. Each signal strength measurement may be linked with an indication of an antenna of antenna array 114 from which the message that the single strength measurement was performed on was transmitted. Each signal strength measurement may also be linked with an indication of an antenna of antenna array 123 through which wireless receiver interface 122 measured the received signal strength.

Wireless receiver interface 122 may make the single strength measurements using antennas 124 of antenna array 123. Each of antennas 124 may be of a similar design, but may be physically arranged such that a main lobe of each antenna is pointed in a different direction. For example, in some embodiments each of antennas 124 have a main lobe that is pointed 45° offset from each other in a plane parallel to the ground. In some embodiments, many more antennas are present as part of antenna array 123. For example, in some embodiments 24 antennas are part of antenna array 123 with each antenna being 15° offset from each other in a plane parallel to the ground. Such antennas may have a main antenna lobe of approximately 15° in width. Therefore, it should be understood that antenna array 123 may have a greater or fewer number of antennas than as illustrated in wireless camera tracking system 100. It should be understood that in many embodiments, antenna array 123 has a greater number of antennas than antenna array 114. The greater number of antennas present as part of antenna array 123 may increase the accuracy of it direction determined by processing system 121 to tag device 110. For example, if 24 antennas are present with a 15° offset, this 15° offset may also be the margin of error for determination of direction to tag 110.

Wireless receiver interface 122 may be configured to receive signal strength measurements, but may also receive messages. Therefore, when a messages transmitted by tag 110, a portion of the message may include dummy data that is exclusively intended for having signal strength measurements performed on it. However, other data may be transmitted that is to be read by wireless receiver interface 122, such as an indication of an identifier of tag 110 and/or an identifier of the antenna of antenna array 114 which transmitted the message. Further, other data may be reported back by tag 110, such as a battery level, signal strength on data received by tag 110 from tracker 120, or other information that may be available locally to tag 110. While wireless receiver interface 122 is referred to as receiver, it should be understood that the use of the word receiver is to emphasize that tracker 120 receives signal strength measurements from tag 110. Wireless receiver interface 122, or some separate transceiver present on tracker 120, may be used to transmit data, such as to tag 110. Wireless receiver interface 122 may be configured to use whichever wireless communication protocol is in use by wireless transmitter interface 113.

Signal strength datastore 125 may be a non-transitory computer readable medium, such as a random-access memory. Signal strength datastore 125 may be used to store signal strength measurements made using antenna array 123 by wireless receiver interface 122. The number of signal strength measurements stored to signal strength datastore 125 may be the number of antennas in antenna array 123 multiplied by the number of antennas present in antenna array 114. That is, for each antenna in antenna array 114, a signal strength measurement may be made using each antenna of antenna array 123. Once a complete set of single strength measurements has been made and stored to signal strength datastore 125, processing system 121 may analyze such signal strength measurements.

Processing system may determine the direction in which tag 110 is located by performing processing as detailed in method 700. In some embodiments, the direction determined is two-dimensional. For example, the direction may be determined in a plane parallel to the ground. In other embodiments, a three-dimensional direction may be determined. Once a direction has been determined, in indication of the direction, such as an angle off of a defined axis, may be output by processing system 121 to direction output interface 126. Direction output interface 126 may output the determined direction to an external device or system. In other embodiments, an external system or device may query direction output interface 126 when the external device or system wants to know the direction of tag device 110.

In some embodiments, the direction is output to motorized tracking assembly 130. Motorized tracking assembly 130 may have a mount, processing system, and one or more motors that allows the motorized tracking assembly 130 to rotate the mount in various directions within a plane or rotate the mount to point in three dimensions. The motorized tracking assembly 130 may rotate the mount based on the received direction data from direction output interface 126. In some embodiments, camera 140, which may be a still or video camera, may be mounted onto the mount of motorized tracking assembly 130. When such a camera is mounted on motorized tracking assembly 130, camera 140 may stay approximately aimed at the object, person, or animal to which tag device 110 is a fixed. To account for an amount of error in determining the direction to tag device 110 due to the number of antennas 124 in antenna array 123, the field of view of camera 140 may be maintained sufficiently wide to accommodate this resolution error range.

Tracker device 120 may have battery assembly 127. Battery assembly 127 may be used to house one or more batteries. The one or more batteries housed by battery assembly 127 may be used to exclusively power tracker 120. That is, components of tracker 120 may not receive power from a source other than battery assembly 127. Accordingly, tracker 120 may be understood to be a wireless device since it wirelessly communicates and has an onboard power source.

Each of tag 110 and tracker 120 may include various other computerized components. For instance, communication buses may be used for communication between wireless receiver interface 122 and processing system 121. Various non-transitory computer readable storage mediums may be present, such as to store signal strength datastore 125. In some embodiments, tracker 120 may be physically integrated as part of motorized tracking assembly 130. In other embodiments, tracker 120 may output in indication of direction by direction output interface 126 to some other device or system, such as a computer system which may use the direction information for a purpose other than pointing a mount.

Figure 2A:
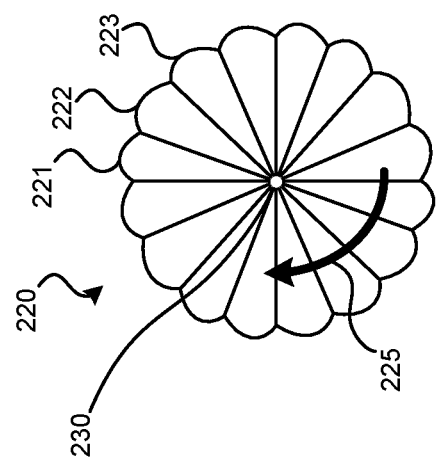
FIGS. 2A-2D illustrate embodiments of tag antenna transmission patterns and tracker antenna receiver patterns.
Figure 2A:
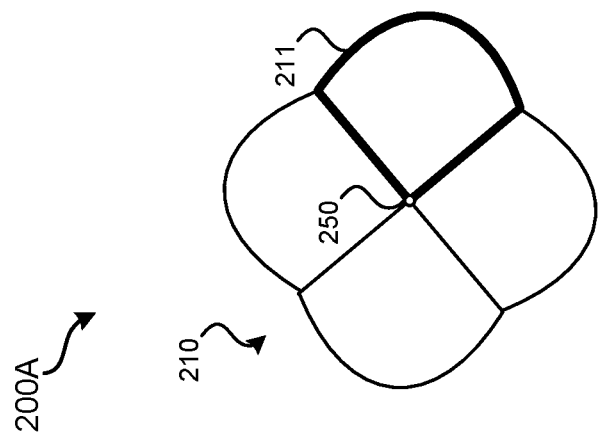

FIGS. 2A-2D illustrate embodiments of tag antenna transmission patterns and tracker antenna receiver patterns. In FIG. 2A, tag device 250 is illustrated. Tag device 250 may represent an embodiment of tag device 110 of FIG. 1. Tag device 250 may have an antenna radiation pattern of 210 for all of its antennas. However, at a given time, only a single antenna may be active. In embodiment 200A, an antenna that has antenna radiation pattern 211 may be the only antenna of tag 250 that is active. Antenna radiation pattern may represent the main lobe region of the antenna radiation pattern. The main lobe may have an angle of approximately 90°. The illustrated edge of antenna radiation pattern 211 may represent the portion of the antenna radiation pattern having a power level within 3 dB of the center of the main lobe. In some embodiments, located between the main lobes of the antenna radiation patterns is a null region having zero or almost no signal strength.

While tag 250 is active transmitting one or more messages via the antenna that has antenna radiation pattern 211, tracker 230 may receive at least a portion of the one or more messages using each antenna of tracker 230. Tracker 230, as illustrated, has sixteen antennas, each of which has a main lobe antenna radiation pattern illustrated. The main lobe of each antenna may have an angle of approximately 22.5°. The illustrated edge of each antenna radiation pattern may represent the portion of the antenna radiation pattern having a power level within 3 dB of the center of the main lobe. Antenna radiation pattern 220 represents each antenna's receive antenna radiation pattern of tracker 230. Each of the antennas associated with these antenna radiation patterns may be activated one at a time in a sequence, such as illustrated by arrow 225. For instance, the antenna of antenna radiation pattern 221 may be activated, then the antenna of antenna radiation pattern 222 may be activated, then the antenna of antenna radiation pattern 223 may be activated, and so on. Each antenna and associated antenna radiation pattern may be used to measure a signal strength of the one or more messages received from the antenna of tag 250 that transmits in antenna radiation pattern 211. In some embodiments, tag 250 may transmit sixteen messages, such that one message is received by each antenna of tracker 230. Tag 250 may transmit using the antenna associated with antenna radiation pattern 211 for a defined period of time such that each antenna of tracker 230 is used to measure signal strength.

Figure 2B:
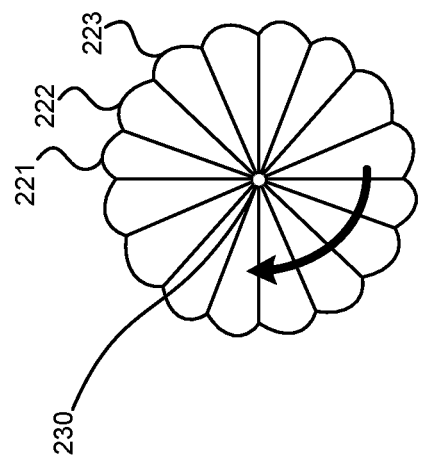
Figure 2B:
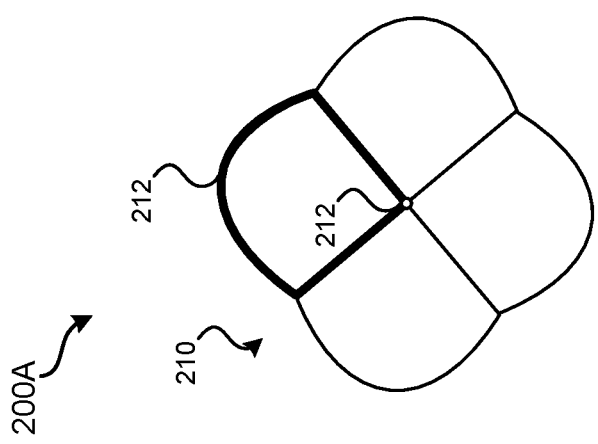

Such a transmission by tag 210 and measurement of signal strength by tracker 230 may repeat for each antenna of tag 210. In FIG. 2B, an antenna that has antenna radiation pattern 212 may be the only antenna of tag 250 that is active. Antenna radiation pattern 212 may represent the main lobe region of the antenna radiation pattern. The main lobe may have an angle of approximately 90°. The illustrated edge of antenna radiation pattern 212 may represent the portion of the antenna radiation pattern having a power level within 3 dB of the center of the main lobe. While tag 250 is active transmitting one or more messages via the antenna that has antenna radiation pattern 212, tracker 230 may receive at least a portion of the one or more messages using each antenna of tracker 230. Each of the antennas of tracker 230 may be activated one at a time in a sequence. For instance, the antenna of antenna radiation pattern 221 may be activated, then the antenna of antenna radiation pattern 222 may be activated, then the antenna of antenna radiation pattern 223 may be activated, and so on. Each antenna and associated antenna radiation pattern may be used to measure a signal strength of the one or more messages received from the antenna of tag 250 having antenna radiation pattern 212. Again, tag 250 may transmit using the antenna associated with antenna radiation pattern 212 for a defined period of time such that each antenna of tracker 230 is used to measure signal strength.

Figure 2C:
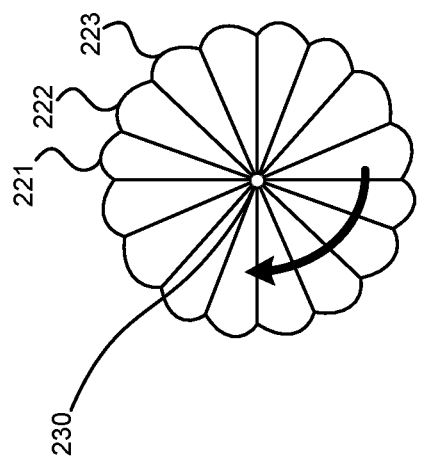
Figure 2C:
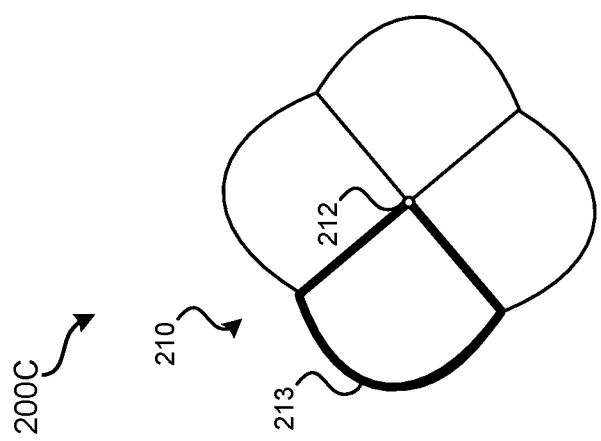

In FIG. 2C, an antenna that has antenna radiation pattern 213 may be the only antenna of tag 250 that is active. Antenna radiation pattern 213 may represent the main lobe region of the antenna radiation pattern. The main lobe may have an angle of approximately 90°. The illustrated edge of antenna radiation pattern 213 may represent the portion of the antenna radiation pattern having a power level within 3 dB of the center of the main lobe. While tag 250 is active transmitting one or more messages via the antenna that has antenna radiation pattern 213, tracker 230 may receive at least a portion of the one or more messages using each antenna of tracker 230. Each of the antennas of tracker 230 may be activated one at a time in a sequence. For instance, the antenna of antenna radiation pattern 221 may be activated, then the antenna of antenna radiation pattern 222 may be activated, then the antenna of antenna radiation pattern 223 may be activated, and so on. Each antenna and associated antenna radiation pattern may be used to measure a signal strength of the one or more messages received from the antenna of tag 250 having antenna radiation pattern 213. Again, tag 250 may transmit using the antenna associated with antenna radiation pattern 213 for a defined period of time such that each antenna of tracker 230 is used to measure signal strength.

Figure 2D:
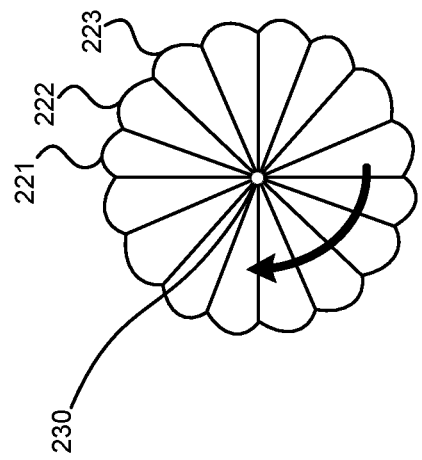
Figure 2D:
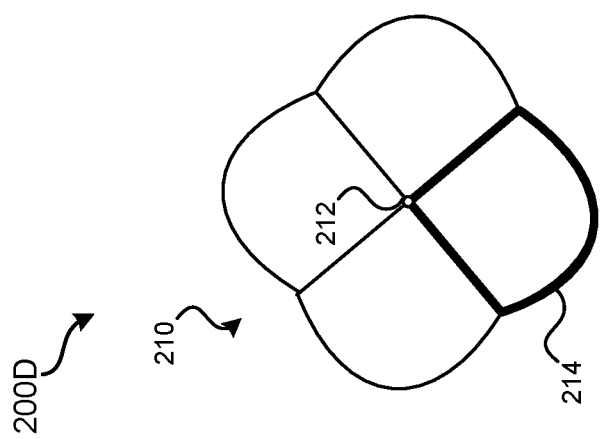

In FIG. 2D, an antenna that has antenna radiation pattern 214 may be the only antenna of tag 250 that is active. Antenna radiation pattern 214 may represent the main lobe region of the antenna radiation pattern. The main lobe may have an angle of approximately 90°. The illustrated edge of antenna radiation pattern 214 may represent the portion of the antenna radiation pattern having a power level within 3 dB of the center of the main lobe. While tag 250 is active transmitting one or more messages via the antenna that has antenna radiation pattern 214, tracker 230 may receive at least a portion of the one or more messages using each antenna of tracker 230. Each of the antennas of tracker 230 may be activated one at a time in a sequence. For instance, the antenna of antenna radiation pattern 221 may be activated, then the antenna of antenna radiation pattern 222 may be activated, then the antenna of antenna radiation pattern 223 may be activated, and so on. Each antenna and associated antenna radiation pattern may be used to measure a signal strength of the one or more messages received from the antenna of tag 250 having antenna radiation pattern 214. Again, tag 250 may transmit using the antenna associated with antenna radiation pattern 214 for a defined period of time such that each antenna of tracker 230 is used to measure signal strength.

Figure 3:
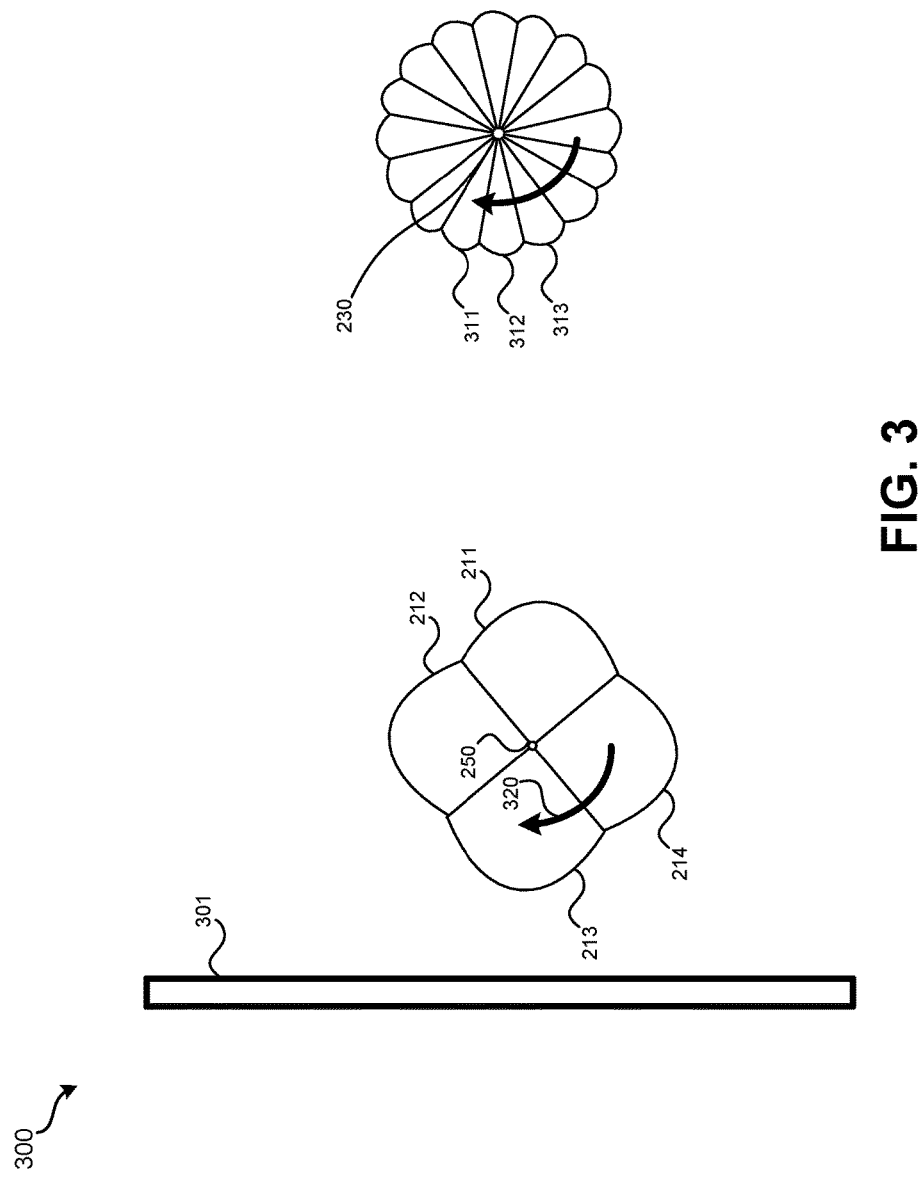
FIG. 3 illustrates an example of a scenario in which an obstacle is present that affects signal strength measurements made by the tracker.

FIG. 3 illustrates an embodiment 300 of a scenario in which an obstacle is present that affects signal strength measurements made by the tracker. In embodiment 300, a wall may be obstacle 301. Tag 250 may sequence through transmitting message through each antenna, as illustrated in FIGS. 2A-2D and as illustrated by arrow 320. Similarly, tracker 230 may progress through making signal strength measurements through each antenna for each transmitting antenna of tag 250. In embodiment 300, due to reflection from obstacle 301, the signal strength measured by tracker 230 will be higher for antenna radiation pattern 213 than antenna radiation pattern 214 or antenna radiation pattern 212. However, antenna radiation pattern 211 will be the strongest and will have the flattest distribution of signal strength measurements across multiple antenna radiation patterns of tracker 230. Having the "flattest" distribution refers to having a smaller amount of signal strength drop off between adjacent antenna measurements of tracker 230 than when other antennas of tag 250 are transmitting. For example, when the antenna associated with antenna radiation pattern 211 is transmitting, the difference between signal strength measurements made using antenna radiation pattern 312 and antenna radiation pattern 311 may be 3 dB and the difference between signal strength measurements made using antenna radiation pattern 312 and antenna radiation pattern 313 may be 4 dB. However, when the antenna associated with antenna radiation pattern 213 is transmitting, the difference between signal strength measurements made using antenna radiation pattern 312 and antenna radiation pattern 311 may be 5 dB and the difference between signal strength measurements made using antenna radiation pattern 312 and antenna radiation pattern 313 may be 7 dB. As such, the signal strength distribution is flatter when antenna radiation pattern 211 of tag 250 is active.

Figure 4:
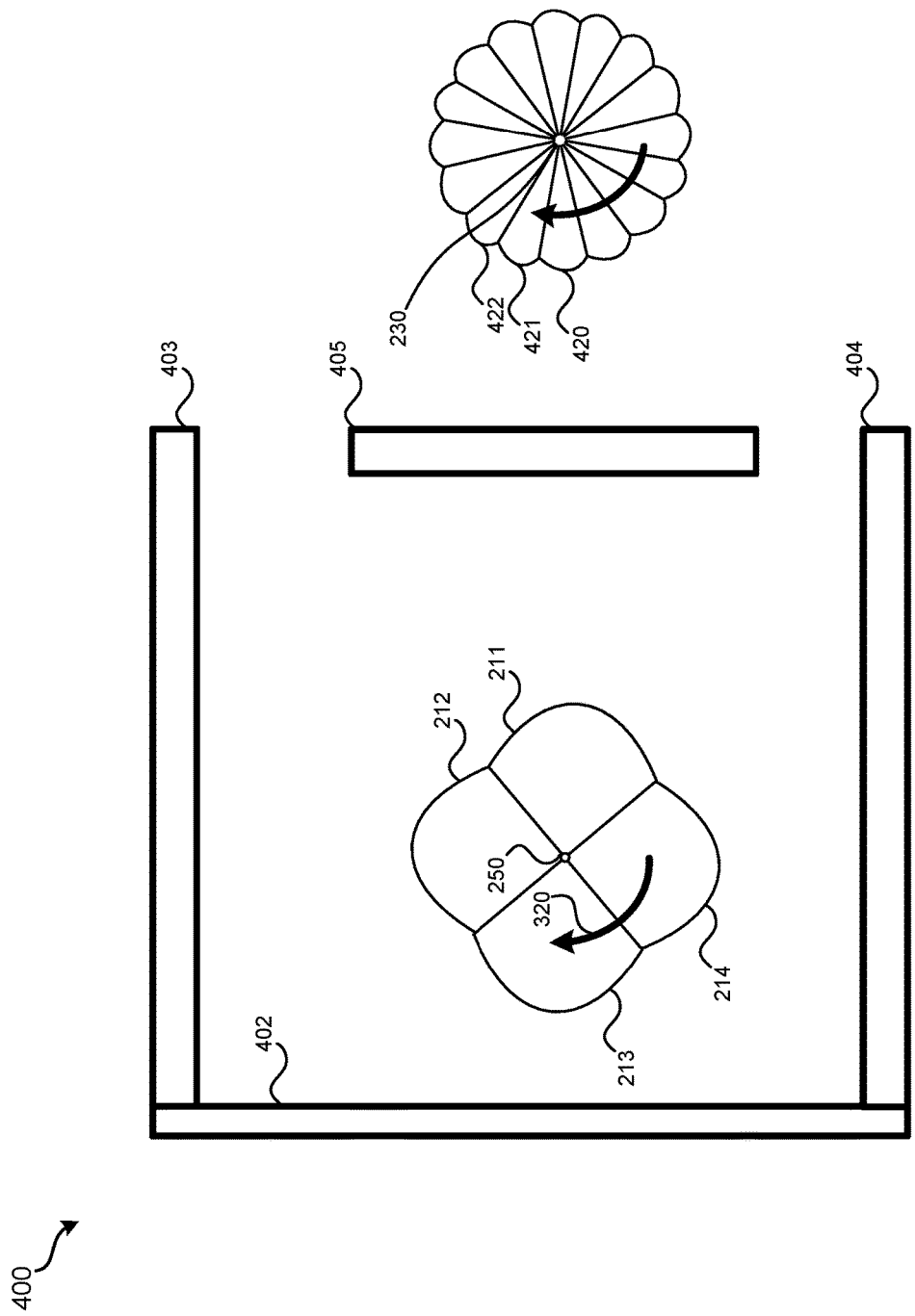
FIG. 4 illustrates a second example of a scenario in which multiple obstacles are present that affects signal strength measurements made by the tracker.

FIG. 4 illustrates an embodiment 400 of a scenario in which multiple obstacles are present that affects signal strength measurements made by the tracker. In embodiment 400, multiple obstacles, which may be walls, are present: obstacles 402, 403, 404, and 405. Tag 250 may sequence through transmitting message through each antenna, as illustrated in FIGS. 2A-2D and as illustrated by arrow 320. Similarly, tracker 230 may progress through making signal strength measurements through each antenna for each transmitting antenna of tag 250. In this scenario, no particular transmitting antenna of tag 250 will result in signal strength measurements at tracker 230 that are significantly greater than other antennas of tag 250. However, signal strength measurements made while the antenna of tag 250 that has antenna radiation pattern 211 will result in the flattest measured signal strengths by tracker 230 across its antennas.

Therefore, for example, if a greatest signal strength measurement is made using antenna radiation pattern 420 while tag 250 is transmitting using antenna radiation pattern 211. A drop in signal strength may be observed in the signal strength measured using antenna radiation pattern 421 and a further signal strength decrease may be measured using antenna radiation pattern 422. In contrast, when antenna radiation pattern 212 is active, a greatest signal strength measurement may be made using antenna radiation pattern 422 (due to a reflection off obstacle 403). A decrease in signal strength may be measured using antenna radiation pattern 421, but an increase to a greater signal strength than antenna radiation pattern 421 but less than antenna radiation pattern 422 may be measured using antenna radiation pattern 420. Thus, when antenna radiation pattern 212 is active, a flat signal strength measurement pattern may not be detected due to the presence of one or more local maximums. For the flattest detected signal strength measurement pattern, the direction may be determined based on the antenna radiation pattern through which the greatest signal strength measurement was measured. In this example, antenna radiation pattern 420 exhibits the highest received signal strength with the flattest overall set of signal strength measurements across all of the antennas of tracker 230 while antenna radiation pattern 211 of tag 250 is active.

Figure 5:
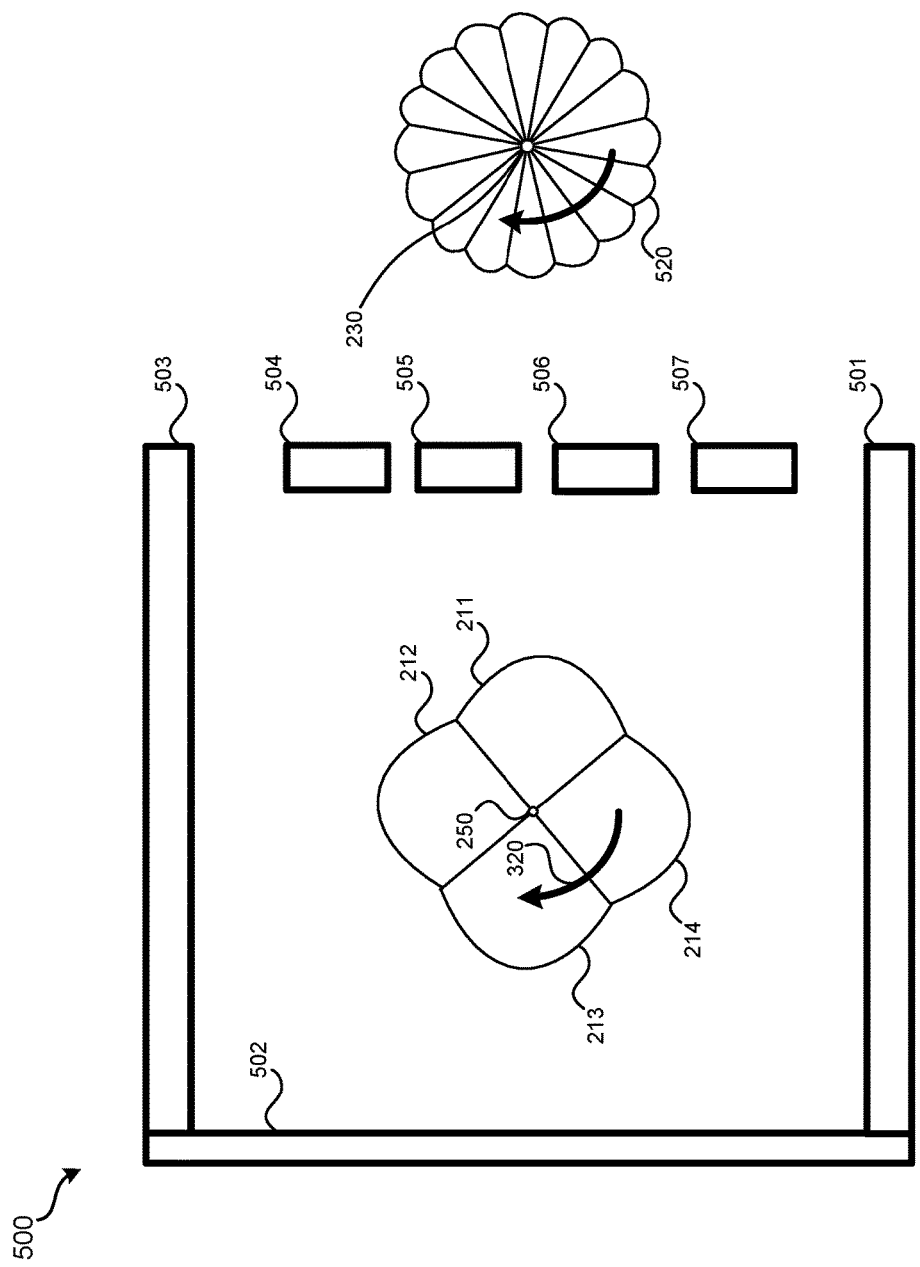
FIG. 5 illustrates a third example of a scenario in which multiple obstacles are present that affects signal strength measurements made by the tracker.

FIG. 5 illustrates an embodiment 500 of a scenario in which multiple obstacles are present that affects signal strength measurements made by the tracker. In embodiment 500, multiple obstacles, which may be walls or other objects, are present: obstacles 501, 502, 503, 504, 505, 506, and 507. Tag 250 may sequence through transmitting message through each antenna, as illustrated in FIGS. 2A-2D and as illustrated by arrow 320. In embodiment 500, no signal strength measurement made when any of antenna radiation patterns 211-214 are active may be greater than a defined threshold difference as compared to other antenna radiation patterns. Further, due to interference of obstacles 501-507, no measured signal strength distribution may be identified as flattest. That is, each signal strength distribution for the different antenna radiation patterns of tag 250 measured by tracker 230 may not meet a minimum threshold to be selected as a flattest signal strength distribution.

In order to determine the direction from tracker 230 to tag 250, overall power measurements made by each antenna of tracker 230 may be summed. For example, for the antenna that is associated with antenna radiation pattern 520, the signal strength received via that antenna may be summed for antenna radiation patterns 211-214 of tag 250. Summations may be created for each antenna of tracker 230. Once the summations are calculated, a maximum signal strength value may be selected from the summations. In both directions (clockwise and counterclockwise) from the maximum signal strength, a signal strength below a defined minimum signal strength threshold may be located. The direction to tag 250 from tracker 230 may be estimated to be half of the angle between the two antennas identified as having the signal strength below the defined minimum signal strength. Further detail is provided in relation to FIG. 6.

Figure 6:
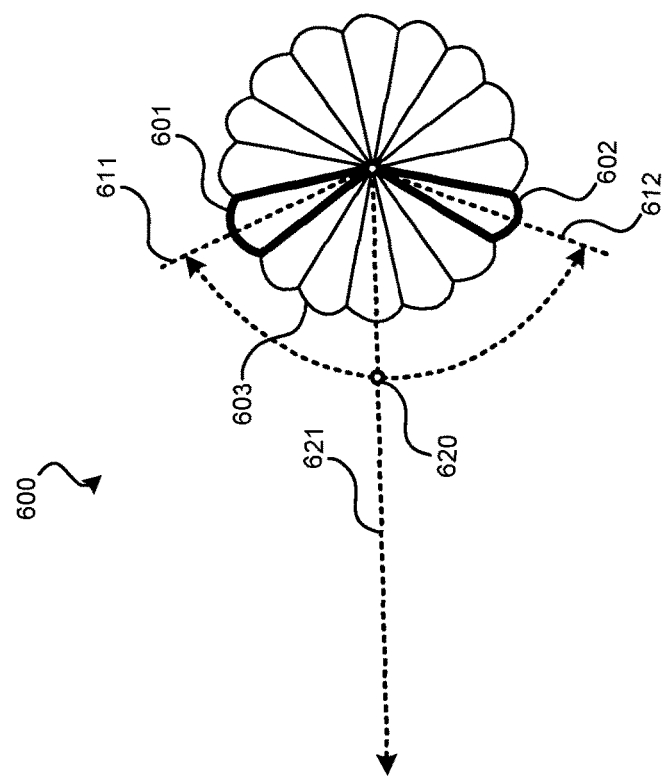
FIG. 6 illustrates an embodiment of using null signal strength measurements to estimate a direction of a tag.

FIG. 6 illustrates an embodiment 600 of using null signal strength measurements to estimate a direction of a tag. Embodiment 600 can represent tag 250 in embodiment 500. In embodiment 600, a "null" signal strength measurement (that is, below a defined minimum signal strength threshold) was present in the summations of signal strength of the antenna radiation patterns 601 and 602. The maximum signal strength measurement may have been identified in the summation of signal strength of antenna radiation patterns 603. In embodiment 600, an angle between the centers 611 and 612 of antenna radiation patterns 601 and 602 is determined. The direction to the tag is estimated as half of this angle, represented by point 620 and direction 621 to the tag.

Figure 7:
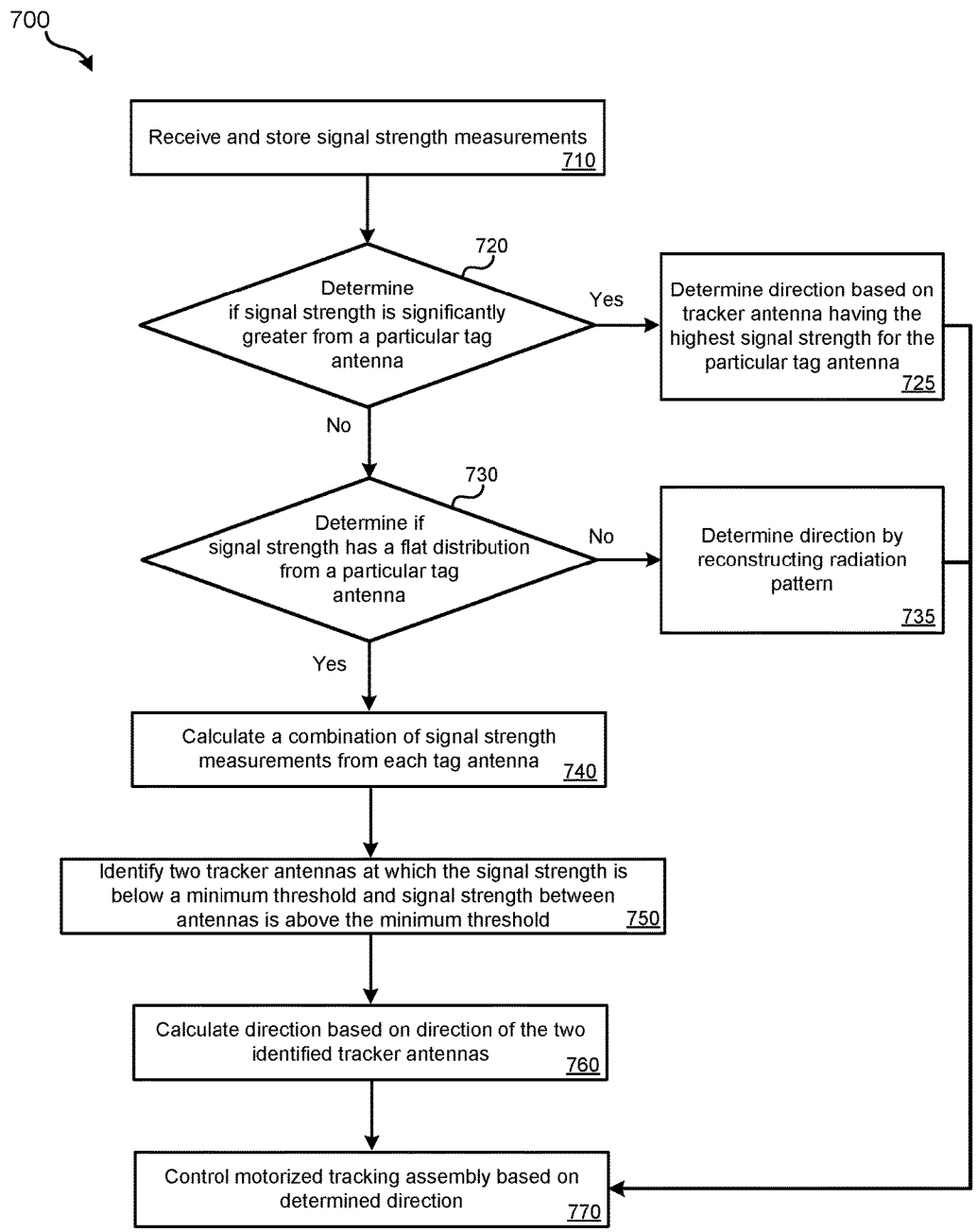
FIG. 7 illustrates an embodiment of a method for using a wireless camera tracking system.

Various methods may be performed using the systems detailed in relation to FIG. 1 through FIG. 6. FIG. 7 illustrates an embodiment of a method 700 for using a wireless camera tracking system. Method 700 may be performed using wireless camera tracking system 100 of FIG. 1. The precise number of antennas present for the tag and the tracker may vary by embodiment. In many embodiments, the tracker will have a greater number of antennas than the tag. At block 710, signal strength measurements may be made using multiple different antennas of a tracker device. The tracker may measure a signal strength at each of its antennas while each antenna of the tag is transmitting. Therefore, the number of signal strength measurements made by the tracker may be the number of antennas of the tracker multiplied by the number of antennas of the tag. The tag may transmit from each of its antennas for a defined period of time. Therefore, the tag transmitting is performed in a TDMA arrangement. Each message transmitted by the tag may indicate: 1) an identifier of the tag; and 2) an indication of the antenna from which the tag is transmitting.

At block 720, it may be determined whether a maximum signal strength measured from a particular tag antenna by a particular antenna of the tracker is greater than signal strength measurements made using other antennas of the tracker and is at least a threshold difference greater than a maximum signal strength measured from each other tag antenna by antennas of the tracker. If so, this is a strong indication that the direction from the tracker to the tag is the direction in which the antenna radiation pattern of the particular antenna of the tracker that measured the maximum signal strength is pointed. Therefore, at block 725, the tracker may determine the direction from the tracker to the tag based on this determination of the maximum signal strength in the direction in which the antenna's antenna radiation pattern is pointed. If at block 720 a maximum signal strength measured by a particular antenna of the tracker is not at least a threshold difference greater than the maximum signal strength measured by other antennas of the tracker, method 700 may proceed to block 730.

At block 730, rather than focusing exclusively on an absolute maximum of signal strength, the flatness of a distribution of signal strength measurements across multiple antennas of the tracker may be analyzed. In a situation with little interference, it can be expected that a particular antenna of the tracker will measure a greatest received signal strength. For antennas in either direction from the antenna with the greatest received signal strength, a drop-off in signal strength may be expected to be measured. For example, a 3 dB signal strength drop-off as compared to the greatest received signal strength may be required to be measured within a predefined number of antennas from the antenna with the greatest received signal strength. If not, the measured signal strength pattern may be determined to be flat. In situations with interference, reflection, or the tag being close to the tracker, a signal strength distribution across multiple antennas of the tracker may be relatively flat.

At block 730 if signal strength measurements do not decrease at least a threshold amount across multiple antennas of the tracker for a particular transmitting antenna of the tag as measured from a maximum signal strength measurement of an antenna of the tracker, a flat distribution may be present and method 700 may proceed to block 740.

If block 730 results in a "no" determination, the measured RSSI values may be used to reconstruct the radiation pattern. For instance, if the RSSI measurements do not result in a particular antenna being identified as having the highest received signal strength of the tracker, a direction to the tag device may be identified by selecting an angle between the two antennas that have the highest received signal strength.

If block 730 results in a "yes" determination, an analysis similar to as detailed in relation to FIGS. 5 and 6 may be performed at blocks 740-760. At block 740, for each antenna of the tracker, a summation of signal strength measurements may be made by the tracker for each transmitting antenna of the tag. Therefore, if the tag has four antennas, for each antenna of the tracker, the four measurements made using the antenna of the tracker for each antenna of the tag may be summed. At block 750, an antenna of the tracker may be identified having the greatest summed signal strength measurement. On either side of this antenna, the tracker may identify an antenna of the tracker at which the signal strength is below a defined minimum signal strength threshold. As such, an angle is present between the two antennas, wherein the angle includes the direction of the antenna beam pattern of the tracker antenna having the greatest summed signal strength measurement.

At block 760, a direction may be calculated based on the direction in which the to identify tracker antennas have the main lobes of their respective antenna radiation patterns. To calculate the direction, an angle between the center of each of the main lobes of the antenna radiation patterns may be determined. The center of the angle may be identified as the direction from the tracker to the tag. In some embodiments, whether or not an accurate direction can be determined at block 760, (for example, an accurate direction may not be possible to determine if two antennas below the minimum threshold cannot be identified), method 700 may result in the tracker transmitting updated settings to the tag. For instance, the tracker may instruct the tag to change a transmission frequency, a transmission power level, and/or how frequent messages are transmitted.

At block 770, a motorized tracking assembly may be controlled by the tracker device based on the determined direction. Therefore, the tracker may output an indication of a direction to the motorized tracking assembly. The indication of this direction may be used by the motorized tracking assembly to adjust the direction in which a mount of the motorized tracking assembly is pointed. A camera or some other device may be attached to the amount such that when the direction is adjusted by the motorized tracking assembly, the direction in which the device that is mounted to the amount is also adjusted.

While each step of method 700 may be performed by an onboard processing system of the tracker, it should be understood that in other embodiments, data may be transmitted, such as via a network, to a remote device or system, such as a cloud-based processing system. The cloud-based processing system may perform the calculations as detailed in method 700 and may control or otherwise provide the determined direction to the motorized tracking assembly at block 770. In still other embodiments, a motorized tracking assembly may not be controlled, rather the determined direction may be used for some other purpose. For example, a display may be presented that indicates a direction determined to a tag.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A wireless tracking system, comprising:
    a tag device, comprising:
        a first plurality of antennas, each antenna of the first plurality of antennas having an antenna radiation pattern pointed in a different direction;
        a wireless transmitter interface that transmits via each antenna of the first plurality of antennas;
        a tag device processing system that causes the wireless transmitter interface to transmit a sequence of messages via the first plurality of antennas, wherein:
            each message of the sequence of messages is transmitted via a different antenna of the first plurality of antennas;
            each message of the sequence of messages is transmitted for a defined time period; and
            each message of the sequence comprises an identifier of the antenna of the first plurality of antennas from which it is transmitted; and
    a tracker device that tracks a direction from the tracker device to the tag device, the tracker device comprising:
        a second plurality of antennas, each antenna of the second plurality of antennas having an antenna radiation pattern pointed in a different direction;
        a wireless interface receiver that performs a plurality of signal strength measurements, wherein each signal strength measurement is made via a different antenna of the second plurality of antennas during the defined time period; and
        a tracker device processing system configured to:
            receive the plurality of signal strength measurements; and
            determine the direction from the tracker device to the tag device using the plurality of signal strength measurements.

2. The wireless tracking system of claim 1, further comprising a motorized tracking assembly, wherein the tracker device processing system is further configured to output the direction to the motorized tracking assembly, and the motorized tracking assembly is configured to physically point a mount of the motorized tracking assembly based on the direction data.

3. The wireless tracking system of claim 2, wherein the motorized tracking assembly is configured to have a video camera mounted onto the mount.

4. The wireless tracking system of claim 1, wherein the second plurality of antennas has a greater number of antennas than the first plurality of antennas.

5. The wireless tracking system of claim 4, wherein the first plurality of antennas comprises four antennas with each antenna of the first plurality of antennas having a 90 degree radiation pattern.

6. The wireless tracking system of claim 5, wherein the second plurality of antennas comprises twenty-four antennas with each antenna of the second plurality of antennas having a 15 degree radiation pattern.

7. The wireless tracking system of claim 1, wherein the tracker device processing system being configured to determine the direction from the tracker device to the tag device using the plurality of signal strength measurements comprises:
  determining that the signal strength measurements made by the wireless interface receiver from the sequence of messages transmitted by the first plurality of antennas are inconclusive as to which of the first plurality of antennas is pointed towards the tracker device;
  in response to the determining, identifying a first antenna of the second plurality of antennas and a second antenna of the second plurality of antennas through which signal strength measurements were made that were below a minimum threshold value and between which the signal strength measurements were above the minimum threshold value; and
  determining the direction from the tracker device to the tag device as a center of an angle between the first antenna and the second antenna.

8. The wireless tracking system of claim 1, wherein the wireless transmitter interface transmits using the IEEE 802.11a standard.

9. The wireless tracking system of claim 1, wherein each message further comprises a tag identifier that identifies the tag device.

10. The wireless tracking system of claim 1, wherein the tag device further comprises a battery compartment and the tag device is exclusively powered by one or more batteries installed in the battery compartment.

11. A method of using a wireless tracking system, the method comprising:
  transmitting, by a tag device of the wireless tracking system, a signal via each tag antenna of a plurality of tag antennas of the tag device, wherein:
    each tag antenna of the plurality of tag antennas is pointed in a different direction; and
    each signal is transmitted sequentially;
  receiving, by a tracker device of the wireless tracking system, each signal transmitted via each tag antenna using each tracker antenna of a plurality of tracker antennas of the tracker device, wherein:
    each signal identifies the tag antenna of the plurality of tag antennas of the tag device from which the signal was transmitted;
  performing, by the tracker device, a plurality of signal strength measurements for each signal received via each tracker antenna of the plurality of tracker antennas; and
  determining the direction from the plurality of tracker antennas to the tag device using the plurality of signal strength measurements.

12. The method for using the wireless tracking system of claim 11, further comprising:
  outputting, by the tracker device, direction data indicative of the direction to a motorized tracking assembly, and the motorized tracking assembly is configured to physically point a mount of the motorized tracking assembly based on the direction data.

13. The method for using the wireless tracking system of claim 12, further comprising:
  capturing video using a video camera that is mounted to the mount of the motorized tracking assembly.

14. The method for using the wireless tracking system of claim 11, wherein the plurality of tracker antennas has a greater number of antennas than the plurality of tag antennas.

15. The method for using the wireless tracking system of claim 11, wherein determining the direction to the tag device using the plurality of signal strength measurements comprises:
  determining that the signal strength measurements made from the signals transmitted by the first plurality of antennas are inconclusive as to which of the plurality of tag antennas is pointed towards the plurality of tracker antennas;
  in response to the determining, identifying a first antenna of the plurality of tracker antennas and a second antenna of the plurality of tracker antennas through which signal strength measurements were made that were below a minimum threshold value and between which the signal strength measurements were above the minimum threshold value; and
  determining the direction to the tag device as a center of an angle between the first antenna and the second antenna.

16. The method for using the wireless tracking system of claim 11, wherein the tag device transmits the signals using the IEEE 802.11a standard.

17. The method for using the wireless tracking system of claim 11, wherein each signal further comprises a tag identifier that identifies the tag device.

18. The method for using the wireless tracking system of claim 11, further comprising:
  exclusively powering the tag device using one or more on-board batteries.

19. The method for using the wireless tracking system of claim 11, wherein the plurality of tag antennas comprises four tag antennas.

20. The method for using the wireless tracking system of claim 11, wherein the plurality of tracker antennas comprises twenty-four tracker antennas.

* * * * *